Oct. 27, 1936.　　　A. E. WILSHUSEN　　　2,058,541
VARIABLE LEVERAGE BRAKE MECHANISM
Filed March 7, 1934
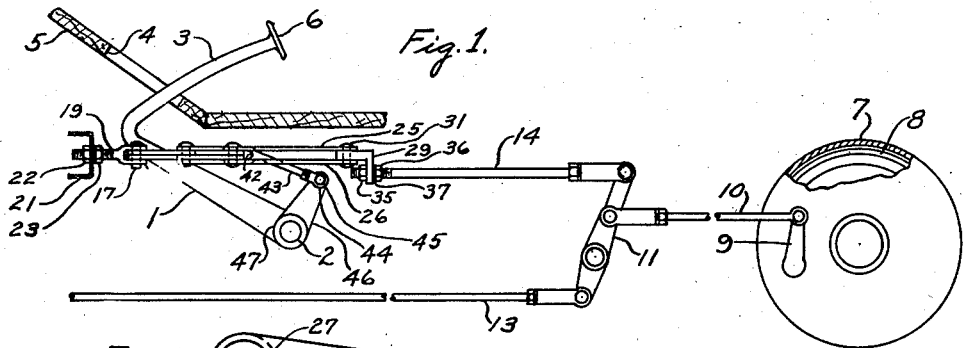
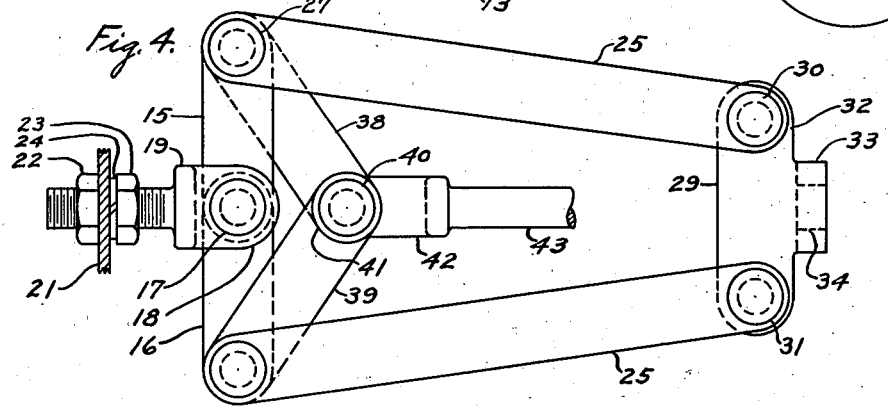
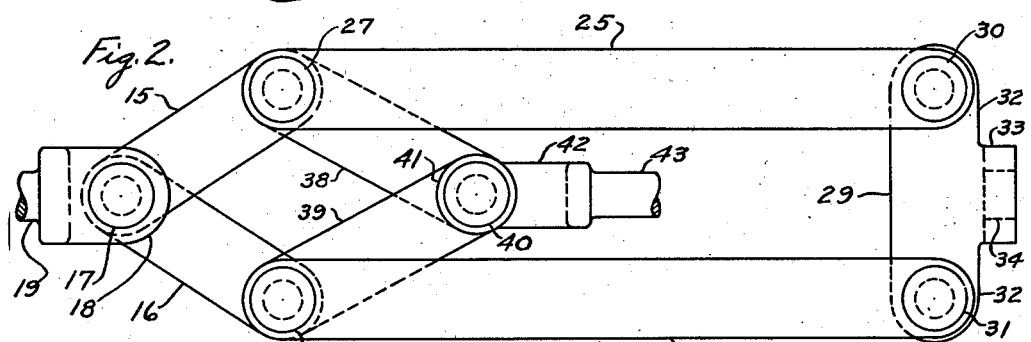
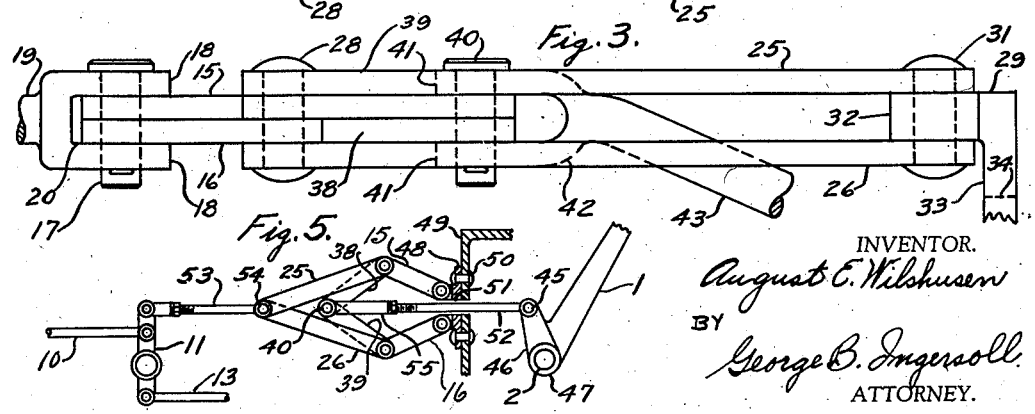
INVENTOR.
August E. Wilshusen
BY
George B. Ingersoll
ATTORNEY.

UNITED STATES PATENT OFFICE 2,058,541

VARIABLE LEVERAGE BRAKE MECHANISM

August E. Wilshusen, Highland Park, Mich.

Application March 7, 1934, Serial No. 714,418

11 Claims. (Cl. 74—516)

My invention relates to improvements in which brake or similar operated mechanisms are actuated by a control lever or similar members; and the objects of my improvements are, first, to provide a variable leverage mechanism for operating a brake mechanism and which will provide an increasingly greater leverage throughout the operative movement of the brake mechanism; second, to provide a variable leverage brake mechanism having a plurality of pairs of toggle or knee acting links operatively connected together and with the brake mechanism; third, to provide a variable leverage brake mechanism in which the operating pressure is applied at a point substantially on its axis and between its ends; fifth, to provide a variable leverage brake mechanism in which the operating pressure is applied thereon at one point throughout the movement of the brake operating mechanism; and sixth, to provide a variable lever brake mechanism having four links pivotally connected together to allow their outer ends to move outwardly when pressure is applied to two of the links.

I attain these objects by the mechanism illustrated in the accompanying drawing, in which—

Figure 1 is a diagrammatic side view of my variable leverage brake mechanism installed on a vehicle having front and rear wheel brakes; Fig. 2, a plan view of my variable leverage brake mechanism in its position corresponding to the beginning of its movement for operating the brakes; Fig. 3, a side view of the variable leverage brake mechanism disclosed in Fig. 2; Fig. 4, a plan view of the variable leverage brake mechanism corresponding to a position in which the brakes have been operated at their applied or braking position; and Fig. 5, an alternative construction of my variable leverage brake mechanism when installed rearwardly of a brake control lever.

Similar numerals refer to similar parts throughout the several views.

The brake pedal or brake control lever 1 is disclosed in Fig. 1 as being suitably mounted on the shaft 2, the brake pedal 1 being adapted to pivotally move about the center of the shaft 2, the brake pedal 1 having the extension portion 3 extending through the slot 4 in the toe board 5 of the vehicle, the extension portion 3 being provided with the pedal pad 6 for receiving the foot of the operator. The brake drum 7 is suitably mounted to be engaged by the brake shoe 8, the brake shoe 8 being suitably provided with operating mechanism for actuating the brake shoe 8 to an engaged position relative to the drum 7, the brake operating mechanism being suitably provided with the lever 9 to which is pivotally connected the rod 10, the rod 10 being provided with a yoke and further pivotally connected to the double end lever 11 which is pivotally connected at its lower end to the yoke end of the rod 13 which may extend forwardly in the vehicle to operatively connect with the front wheel brake mechanism of the vehicle, the rod 10 being disclosed as being operatively connected, as above described, to the rear brake operating mechanism of the vehicle.

The upper end of the double end lever 11 is pivotally connected with the yoke end of the rod 15 14. The links or members 15 and 16 are mounted to pivotally move at their forward ends about the pin 17 which extends through the bosses 18 of the yoke 19, the links 15 and 16 being adapted to pivotally move adjacent one another in the jaw space or portion 20 of the bosses 18 on the yoke member 19, the links 15 and 16 being restrained from longitudinal movement.

It is to be noted that the yoke member 19 will be suitably anchored in any portion of the vehicle, the yoke member 19 being disclosed in Figures 1 and 4 as being anchored in the frame cross member 21, the yoke member 19 having a threaded end extending through the vertical web of the frame cross member 21, the threaded end of the yoke member 19 being secured by the nuts 22 and 23 and the lock washer 24, the yoke member 19 thus being adjustably mounted relative to the frame cross member 21.

The links 15 and 16 are pivotally connected to the upper and lower pairs of links 25 and 26, a pair of the links 25 and 26 being located at each outer side of the variable leverage brake mechanism, a pair of links 25 and 26 being connected to the link 15 by the rivets 27, the second pair of links 25 and 26 being connected to the link 16 by the rivets 28. The rear ends of the pair of links 25 and 26 will be pivotally connected to the bracket 29 by the rivets 30 and 31. The bracket 29 will be provided with the oppositely disposed bosses or boss portions 32 which extend between each of the pairs of links 25 and 26, the rivet 31 extending through suitable holes in the pairs of links 25 and 26 and in the boss portions 32 of the bracket 29. The bracket 29 is further provided with the offset boss portion 33 which is provided with the hole 34 through which extends the forward end of the rod 14, the forward end of the rod 14 being suitably threaded so that it may be secured in the opening 34 of the boss portion 33 of the bracket 29 by the nuts 35, 36 and the lock washer 37. The links 38 and 39 are also pivotally mounted respectively on the rivets 27 and 28 which thus pivotally connect the links 38 and 39 with the links 15 and 16, the links 38 and 39 being further pivotally connected together at their inner or rearmost ends by the pin 40 which extends through holes in the inner or rearward ends of the links 38 and 39 and also through the jaw portions 41 of the yoke end 42 which is provided with the rod portion 43 which may be threaded at its outer end to connect with the yoke 44 which is pivotally connected by the pin 45 to the lever arm 46 which forms a portion of the brake pedal 1 and pivotally moved therewith. The rod portion 43 may be suitably bent or formed to extend below the links 26 to suitably connect with the lever arm 46, thus enabling the lever arm 46 to pivotally move below or adjacent the variable leverage brake mechanism. The brake pedal 1 will be suitably provided with the hub portion 47 which may extend longitudinally along the shaft 2 for a sufficient length to permit the lever arm 46 to be located in alignment with the yoke 42 and at the same time permit the brake pedal 1, together with its extension 3 and pad 6 to be suitably located at one side of the variable brake mechanism.

In operation, when the brake pedal 1 is pivotally moved downwardly by pressure being applied to the pad 6 by the foot of the operator of the vehicle, the lever arm 46 will exert a thrust applying pressure through the yoke 44, the rod 43 and the yoke 42 to move the pin 40, together with the links 38 and 39 forwardly or to the left as viewed in Figures 1, 2, 3, and 4, the forward movement of the links 38 and 39 moving the rivets 27 and 28 forwardly and at the same time outwardly relative to the axis of the yoke member 19, the movement of the rivets 27 and 28 thus causing the links 15 and 16 to move forwardly, the links 15 and 16 pivotally moving about the pin 17, the forward ends of the links 15 and 16 being anchored in the yoke 19 and preventing longitudinal movement of the links 15 and 16.

It will thus be noted that the above described movement of the links 38 and 39, together with the links 15 and 16 will cause a spreading movement of said links 15, 16, 38, and 39 and will thus exert a pull through the pairs of links 25 and 26 to the bracket 29, causing the bracket 29, together with its operatively connected rod 14, to move forward with the downward movement of the brake pedal 1.

It will thus be noted that my variable leverage brake mechanism is provided with a double toggle or knee action joint operatively connected so that a force may be applied therethrough to the double toggle joint or knee action mechanism, thus tending to move or straighten the links 15, 16, 38, and 39 from their normal position as disclosed in Fig. 2 to or toward their positions as disclosed in Fig. 4, corresponding to the position of the brake mechanism, provided with the brake drum 7 and the brake shoe 8, when the brake drum 7 and the brake shoe 8 are in their operative positions for effecting a braking movement of the vehicle.

It is to be noted that the above mentioned movement of the links 15, 16, 38, and 39 will cause an increasing pressure to be applied longitudinally through the pairs of links 25 and 26 to actuate the rod 14, together with its operatively connected mechanism, for operating the brakes of a vehicle, throughout the operative movement of the brake mechanism.

It will thus be noted that as the pin 40 is moved forwardly by the downward movement of the pedal 1, the rivets 27 and 28 will be moved forwardly at a slower rate of speed which will permit an increased pressure to be applied through the pairs of links 25 and 26 to operatively move the rod 14, an increasingly greater leverage thus being applied throughout the movement of the variable leverage brake mechanism.

It is also to be noted that the greater leverage will be applied at or toward the end of the movement of the brake pedal 1 which will correspond to the effective brake operating position of the brake mechanism of the vehicle.

It is also to be noted that the pairs of links 25 and 26 will move from their normal position as disclosed in Fig. 2, in which they extend substantially parallel with one another, to their positions, as disclosed in Fig. 4, at the end of their operating movement, in which the pairs of links 25 and 26 occupy convergent positions relative to the axis of the fixed yoke member 19.

When it is desired to accommodate an installation in which the brake pedal 1 is located ahead of the point in which it is desired to mount my variable leverage brake mechanism, this may be accomplished as disclosed in Fig. 5, in which the bracket 48 may be suitably secured to the cross member 49 by the rivets 50, the bracket 48 being provided with a central opening 51 through which the rod 52 may extend to operatively connect by its yoke end 55, with the pin 40, the rod 52 being further pivotally connected with the lever arm 46, as disclosed in Fig. 5.

Also it is to be noted that in Fig. 5, the pairs of links 25 and 26 will occupy a convergent position relative to one another in their normal position, the rearward ends of the pairs of links 25 and 26 being pivotally connected to the rod 53 by means of the pin 54, the rod 53 being operatively and pivotally connected with the upper end of the double lever arm 11 in a similar manner to that disclosed in Fig. 1.

It is to be further noted that my variable leverage brake mechanism will thus be mounted to provide, when used in Fig. 1, an adjustable mounting at its forward end and also will be adjustably connected at its rearward end to the rod 14.

It is also to be noted that the increased leverage which will be applied to the mechanism for operating the brakes of the vehicle will be applied continuously from the beginning of the movement of the brake pedal 1 to the end of its movement, thus eliminating any interruption of the increased leverage application to the brake mechanism. My variable leverage brake mechanism also provides for the power to be increasingly applied through the operative movement necessary to set the brakes of the vehicle without any termination or "fade-out" of the increasingly applied leverage application throughout the operation of setting the brakes of the vehicle.

It is also to be understood that my variable leverage brake mechanism will not be limited to an application in which the driver manually exerts operative pressure for operating the brakes of the vehicle, nor to brake mechanisms, but can be applied and installed with various mechanisms where it is desired to apply and increase the applied pressure with a greater leverage through the movement of the control lever member having a limited amount of operating movement.

I claim:

1. In a variable leverage mechanism for operating the brake mechanism of a vehicle provided with brake operating mechanism having a brake control lever, the combination of a member anchored on a portion of the vehicle, means for adjusting the anchored position of said member, a pair of links pivotally connected to each other and to said member, a second pair of links pivotally connected to each other and to one of the ends of each of said first mentioned pair of links, a third pair of links pivotally connected to said first mentioned and said second pair of links at the points where said first mentioned and said second pairs of links are pivotally connected together, means for operatively connecting the brake control lever of the vehicle with said second pair of links at the point where said pair of links are pivotally connected together, said last mentioned means extending between said third pair of links, a bracket member pivotally connected to said third pair of links, and means for adjustably connecting said third pair of links to the brake operating mechanism of the vehicle.

2. In a variable leverage mechanism for operating the brake mechanism of a vehicle provided with power developing means, the combination of a toggle mechanism comprising a pair of links pivotally connected together, said pair of links being anchored, at the point where they are connected together, against longitudinal movement, said toggle mechanism further comprising a second pair of links connected together and with said first mentioned pair of links, a third pair of links each connected with one of said first mentioned and said second pair of links, said third pair of links extending substantially parallel when the brake mechanism is not being operated, a member connecting the remaining ends of said third pair of links, said third pair of links together with said last mentioned member operatively connecting said toggle mechanism with the brake mechanism of the vehicle, and a rod member connected with said second pair of links and with the power developing means of the vehicle, said rod member having its point of connection with said second pair of links at a point intermediate the anchored end of said toggle mechanism and the outer ends of said third pair of links.

3. In a variable leverage mechanism having a brake lever for operating a vehicle, the combination of an anchored member, a toggle mechanism comprising four link members, two of said link members being connected at their forward ends to said anchored member, the other two of said link members of said toggle mechanism having their ends adapted for movement towards said anchored member, means for operatively connecting said last mentioned ends of said two link members with the brake lever of the vehicle, and means for operatively connecting the outer-most ends of said four link members with the brake mechanism of the vehicle.

4. In a variable leverage mechanism for operating a brake rod operatively connected with the brake mechanism of a vehicle, said brake mechanism being provided with a brake control lever, the combination of a member anchored against movement, two pairs of toggle members connected with each other, one of said pairs of toggle members being connected to said member, link members operatively connected with each of said pairs of toggle members and with said brake rod of the brake mechanism of the vehicle, and a rod member pivotally connected with one of said pairs of toggle members and with the brake control lever of the vehicle.

5. In a variable leverage mechanism for operating a brake mechanism having a brake control lever, the combination of an anchored member, a pair of links each having ends pivotally mounted and connected with said anchored member to anchor said pair of links against longitudinal movement, a second pair of links each pivotally connected with one of said first mentioned pair of links and adapted for longitudinal movement, a rod, means operatively connecting an end of each of said second pair of links with the brake control lever, and link means for operatively connecting an end of each of said first mentioned and said second pairs of links with the brake mechanism, said last mentioned link means extending longitudinally adjacent the outer sides of said first mentioned means.

6. In a variable leverage mechanism for operating a brake mechanism of a vehicle having a brake control lever, the combination of a rod member operatively connected with the brake mechanism and adapted to transmit operating forces thereto, a pair of link members operatively connected with said rod member, a plurality of pairs of links pivotally connected with each other and with said first mentioned pair of link members, a bracket member pivotally connected with and anchoring one of said plurality of pairs of links against longitudinal movement, and rod means for operatively connecting one of said plurality of pairs of links with the brake control lever, said last mentioned means extending between said first mentioned pair of link members.

7. In a variable leverage mechanism for operating a brake mechanism, the combination of an anchor bracket, four links pivotally connected with one another, two of said four links being pivotally connected with said anchor bracket to hold said two links against longitudinal movement, rod means for applying pressure to two of said links to move the outer ends of said four links outwardly relative to the anchored portion of said first mentioned two of said four links, a pair of links pivotally connected with and adapted to move with the outer ends of said four links, and bracket means for connecting said last mentioned pair of links with the brake mechanism.

8. In a variable leverage mechanism for operating a brake mechanism of a vehicle having a brake control lever, the combination of a member suitably anchored to a portion of a vehicle, a pair of links pivotally mounted on said member, a second pair of links pivotally connected to each other and to the outer ends of said first mentioned pair of links, means for applying pressure to the inner ends of said last mentioned pair of links, said means being operatively connected with the brake control lever of the vehicle, a pair of link means pivotally connected with the outer ends of each of said first mentioned and said second pairs of links, and bracket means pivotally connected with said last mentioned pair of link means and operatively connecting said last mentioned pair of link means with the brake mechanism of the vehicle.

9. In a variable leverage mechanism for a vehicle provided with brake operating means having a brake control lever, the combination of a bracket member anchored on the vehicle, a pair of links pivotally connected to said bracket member, a second pair of links pivotally connected to each other and to said first mentioned pair of links, a pair of link means pivotally connected to said first mentioned and said second pair of links at points where said first mentioned and said second pair of links are pivotally connected together, rod means pivotally connected with second pair of links at a point where said second pair of links are pivotally connected together, said rod means being operatively connected with the brake control lever of the vehicle, a second bracket member pivotally connected to each of said pair of link means, and means for connecting said second bracket member to the brake operating mechanism of the vehicle.

10. In a variable leverage mechanism for operating the brake mechanism of a vehicle having a brake control lever, the combination of an anchorage member, a pair of links pivotally supported on said anchorage member, a second pair of links pivotally connected together and to said first mentioned links, a pair of pull means each pivotally connected to one only of each of said first mentioned and said second pairs of links, a second bracket connecting the other ends of each of said pair of pull means, sad second bracket being operatively connected with the brake operating mechanism of the vehicle, and a force transmitting member operatively connecting said second pair of links and the brake control lever of the vehicle.

11. In a vehicle, a variable leverage mechanism for operating a brake mechanism provided with power developing means, the combination of a toggle mechanism comprising four links pivotally connected solely at their end portions and arranged substantially in a rectangular formation when the brake mechanism is not being operated, means anchoring one corner of the rectangular formation against longitudinal movement relative to the variable lever mechanism, means connecting the opposite corner of the rectangular formation with the power developing means, the side and said opposite corner of the rectangular formation being adapted to move longitudinally relative to the variable lever mechanism, and means further connecting the rectangular formation with the brake mechanism of the vehicle.

AUGUST E. WILSHUSEN.